United States Patent [19]
Konomi

[11] 3,831,439
[45] Aug. 27, 1974

[54] FUEL CONSUMPTION METER
[75] Inventor: Toshiaki Konomi, Susono, Japan
[73] Assignee: Toyota Jidosha Kogyo Kabushiki Kaisha, Toyota-shi, Japan
[22] Filed: June 29, 1973
[21] Appl. No.: 374,995

[30] Foreign Application Priority Data
June 30, 1972 Japan.............................. 47-77901

[52] U.S. Cl. ................................................ 73/113
[51] Int. Cl. ........................................ G01m 17/00
[58] Field of Search .............. 73/113, 114, 200, 168

[56] References Cited
UNITED STATES PATENTS
| | | | |
|---|---|---|---|
| 3,252,322 | 5/1966 | Pring...................................... | 73/113 |
| 3,739,761 | 6/1973 | Niles................................ | 73/113 X |
| 3,750,463 | 8/1973 | Erwin, Jr. ............................. | 73/113 |

Primary Examiner—Jerry W. Myracle
Attorney, Agent, or Firm—Robert E. Burns; Emmanuel J. Lobato; Bruce L. Adams

[57] ABSTRACT

A fuel consumption meter for a motor vehicle comprises a bubble separating vessel and a fuel flow meter connected in series in the main pipeline between the fuel pump and a fuel supply member of the vehicle. The bubble separating vessel has an air vent valve, a float for measuring specific gravity and a thermometer. An auxiliary pipeline connected in parallel with the portion of the main containing the bubble separating vessel and the fuel flow meter provides a circulating circuit in which an electric pump is provided so as to recirculate the fuel through the bubble separating vessel and fuel flow meter in order to remove any air from the system. An electric circuit comprises controls for electromagnetic valves and for the circulating pump and amplifying, indicating and timing circuits for the fuel flow meter.

10 Claims, 3 Drawing Figures

FUEL CONSUMPTION METER

FIELD OF INVENTION

This invention relates to fuel consumption meters particularly for motor vehicles.

BRIEF REVIEW OF THE PRIOR ART

A conventional fuel consumption meter is provided with a vent for air bubbles within the meter. However, it cannot forcefully remove air in the pipeline as well as within the meter. Also it is not provided with mechanism for checking to see if the fuel consumption meter is operating normally.

Therefore, when the fuel consumption is measured in an exhaust gas test mode measurement, as it is necessary to start the measurement in the cold state of engine, the exhaust gas test can be performed only after connecting the fuel consumption meter, starting the engine, running it long enough to remove air in fuel pipeline, and then leaving the engine for 5 to 8 hours until it becomes cool.

Moreover, when the engine stops on account or air entering into the fuel consumption meter and fuel pipeline, causing error in the fuel consumption meter, the exhaust gas test becomes ineffective and must be performed again in the cold state of the engine.

Although measurement of specific gravity and temperature of fuel is indispensable with a fuel consumption meter of the capacity type on account of lack of internally mounted specific gravity meter and fuel thermometer, the specific gravity of the fuel must be measured after the fuel is transferred to another vessel so that there are problems in harm to an inspector by lead, danger of fire, and disposal of fuel after measuring the specific gravity.

OBJECT OF THE INVENTION

The principal object of the invention is to provide a fuel consumption meter permitting a speedy test by forcefully removing air from the fuel consumption meter and also from the pipeline without using the vehicle engine before an exhaust gast test, fuel consumption test and the like.

Another object of the invention is to provide a rule consumption meter permitting self-checking of operation and also permitting measurement of specific gravity and temperature of fuel.

A still further object of the invention is to provide a fuel consumption meter for separating bubbles from the fuel to prevent bad effects on the meter.

Other and further objects and advantages will be apparent from the following description taken in connection with the accompanying drawings.

DETAILED DESCRIPTION OF PREFERRED EMBODIMENT

Figure 1:
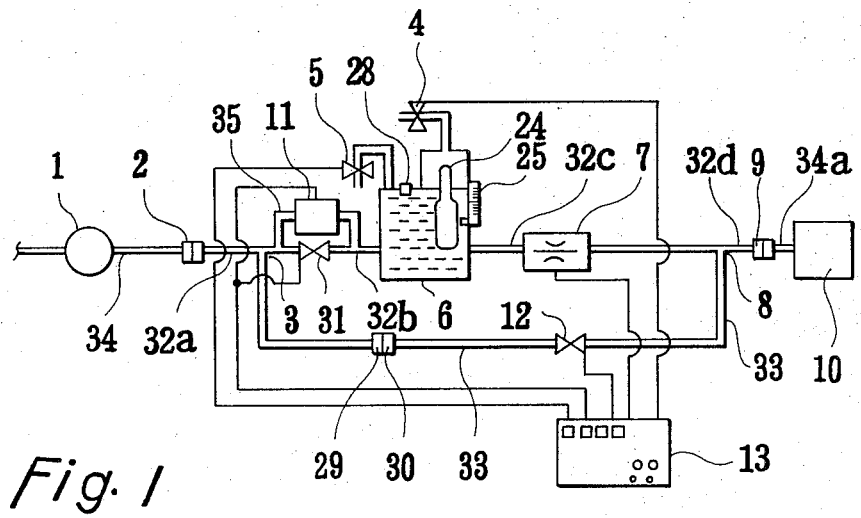
FIG. 1 is a diagrammatic illustration of fuel consumption measuring apparatus, embodying the present invention, arranged betwen the fuel pump and a fuel supply member of an engine.

Referring to FIG. 1, a fuel pump 1 mounted on an engine or in a vehicle, pumps fuel to a fuel supply member 10 for a carburettor or other fuel feed means of an engine. A fuel pipe 34 is connected to the fuel pump 1, and another fuel pipeline 34a is connected to the fuel supply member 10. Both pipelines 34 and 34a are connected to opposite ends of a main fuel pipeline 32 of the fuel consumption meter at joints 2 and 9. The main fuel pipeline 32 comprises portions designated 32a–32d.

Figure 3:
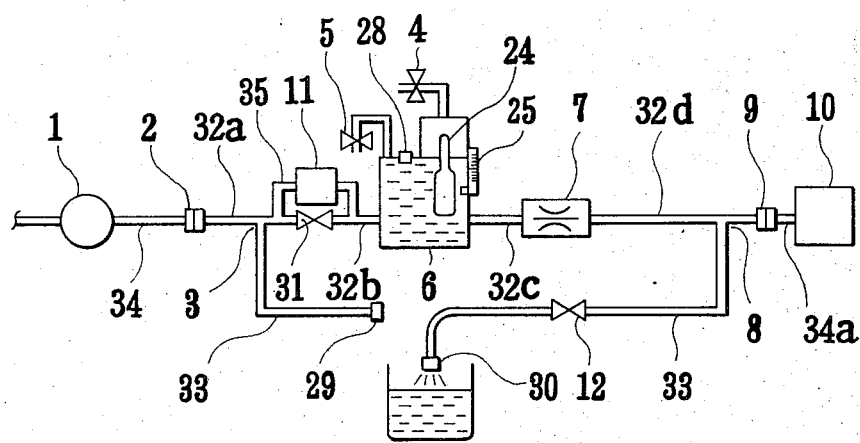
FIG. 3 illustrates the operation of the apparatus of FIG. 1.

The fuel consumption meter comprises the main pipeline 32, an electromagnetic valve 31, a bubble separating vessel 6 and a fuel flow measuring instrument 7 connected in series. An auxiliary pipeline 33 is connected in parallel to the main pipeline 32 with one end connected at a junction 3 between a joint 2 and an electromagnetic valve 31 and the other end connected at a junction 8 between the fuel flow measuring instrument 7 and a joint 9. The auxiliary pipeline provides a circuit to circulate repeatedly fuel passing through the bubble separating vessel 6 and the fuel flow measuring instrument 7, and another auxiliary pipeline 35 by-passing the electromagnetic valve 31. The auxiliary pipeline 33 is provided with an electromagnetic valve 12 which operates in reverse to the electromagnetic valve 31. In the embodiment shown in FIG. 1 the auxiliary pipeline 33 also contains interconnecting joints 29 and 30 so that the line can be opened as shown in FIG. 3. The joint 29 is self-closing (in a manner well known in connecting joints) while the joint 30 is open. The joints 29 and 30 are omitted in FIG. 2.

The auxiliary pipeline 35 is provided with an electric pump 11. The bubble separation vessel 6 is provided with a float 24 for measuring the specific gravity of the fuel, a thermometer 25, an automatic air vent valve 28 and an electromagnetic air vent valve 4, and an electromagnetic fuel level adjusting valve 5. These electromagnetic valves and electric instruments such as the fuel flow measuring instrument 7 and the electric pump 11 are controlled by a fuel consumption meter control device 13.

Figure 2:
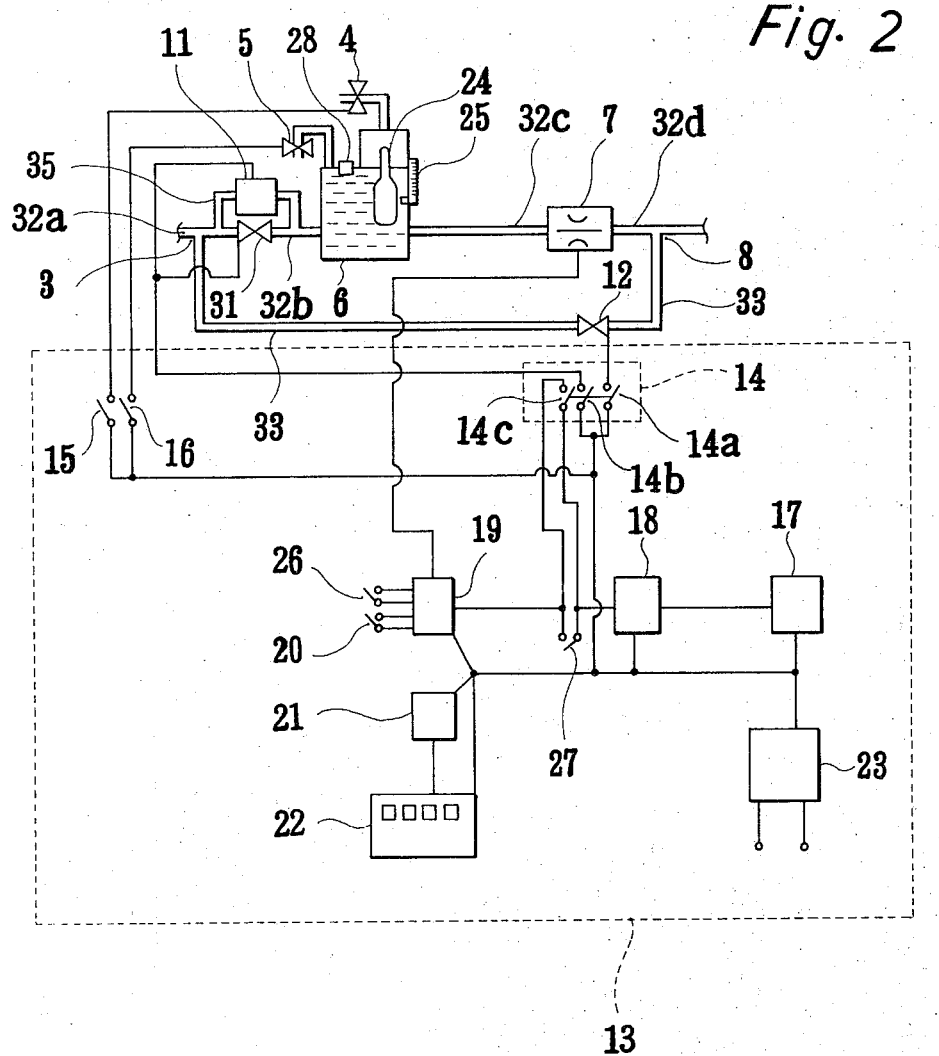
FIG. 2 is a diagrammatic illustration of a control circuit for a fuel consumption meter like that of FIG. 1 except that no fluid coupling is shown in the recirculation pipeline.

Referring to FIG. 2, the fuel consumption meter control device 13 is provided with an air vent switch 14 comprising three interlocking contacts. Contacts 14a and 14b are connected in series to a direct current converter (rectifier) 23 of an electric power source and a contact 14c is connected through a gate signal generator 18 and a reference time signal generator 17 to the direct current converter 23. The contact 14a is electrically connected to the electromagnetic valve 12 for controlling the auxiliary pipeline 33. The contact 14b is connected to the electromagnetic valve 31 for controlling the pipe 32b between inlet and outlet of the auxiliary pipeline 35 and to the pump 11. The contact 14c is connected to the fuel flow measuring instrument 6 through the fuel flow meter 19 provided with a manually operated gate switch 20 and a manually operated reset switch 26.

At the bubble separating vessel 6, the electromagnetic air vent valve 4 and the electromagnetic fuel level adjusting valve 5 are connected to the electric source by switches 15 and 16 respectively. The fuel flow meter 19 is connected in series to the reference time signal generator 17 and the gate signal generator 18 through a unit time setting switch 27, and is further connected to the electric source through the rectifier 23. The control circuit further comprises an amplifier 2 and a fuel flow indicator 22.

Operation of the apparatus according to the invention will now be described. The fuel consumption meter is connected in series with the fuel supply line of the engine of a vehicle so that end parts 32a and 32d of the main pipeline 32 of the fuel consumption meter are connected by joints 2 and 9 respectively to the pipeline 34 of the fuel pump 1 and the pipeline 34a of the fuel supply member 10.

Upon making this connection, mixing of air occurs mainly at joints 2 and 9 within the fuel consumption meter.

Before performing an exhaust gas test or fuel consumption test, the air vent switch 14 is turned on, the contacts 14a, 14b and 14c are closed, the electromagnetic valve 12 opens and the electric pump 11 is driven and the electromagnetic valve 31 is closed. At the same time, the gate signal generator 18 and the fuel flow meter 19 become conductive. Fuel is thereby circulated by the pump 11 in the following circuit;

junction 3 — electric pump 11 — bubble separing vessel 6 — fuel flow meter 7 — main pipeline 32d — joint 8 — electromagnetic valve 12 — auxiliary pipeline 33 — junction 3.

Any air mixed in fuel is separated at the bubble separating vessel 6, and fuel only is transmitted to the fuel flow measuring instrument 7 and further. At the fuel flow measuring instrument 7, fuel flow amount is measured mechanically and immediately converted into an electrical signal, which is transmitted to the fuel flow meter 19.

A reference time signal is transmitted from the reference time signal generator 17 to the gate signal generator 18 and this operation is repeated at a definite time interval in such manner that the gate is closed, the fuel flow meter 19 and the fuel flow indicator 22 are returned to zero, and immediately the gate is opened. Therefore, electric signal transmitted from the fuel flow instrument 7 to the fuel flow meter 19 is integrated repeatedly in a predetermined time interval and is transmitted to the amplifier 21. The signal is thereupon amplified by the amplifier and is indicated as fuel flow amount per unit time at the fuel flow indicate 22.

Known automatic air vent valve 28 opens only when air is present at the valve, and then only air is exhausted and the fuel remains in the bubble separator vessel. The electric pump 11 always circulates fuel at a constant rate.

The fuel flow measuring instrument 7 indicates fuel flow amount per unit time, which, during recirculation through the auxiliary pipeline, is the circulating flow amount after subtraction of an air volume exhausted by the automatic air vent valve 28. As the air venting operation progresses and amount of air exhausted through the air vent valve 28 decreases, flow amount per unit time indicated at the fuel measuring instrument 7 increases. Thus completion of the air venting is indicated by a flow amount per unit time determined by the electric pump 11. Therefore, a flow amount per unit time within definit range indicates correct operation of the fuel consumption meter and completion of air venting. Also visual inspection of the bubble separating vessel 6 (which may be transparent) can confirm whether bubbles in the circulating fuel are completely vented or not.

When air venting is finished, the air vent switch 14 is turned off, all contacts 14a, 14b and 14c are opened, thereby the electric pump 11 stops, the electromagnetic valve 12 shuts the auxiliary pipeline 33, the electromagnetic valve 31 opens, and gate signal from the gate signal generator 18 to the fuel flow meter 19 is interrupted.

In the testing process, the engine is started and fuel is supplied from the fuel pump 1 through the junction 3, the electromagnetic valve 31, the bubble separating vessel 6, the fuel flow measuring instrument 7 and the junction 8 to the fuel supply member 10. As fuel is transmitted from the fuel pump 1 to the fuel flow measuring instrument 7 through the bubble separating vessel 6, any air mixed in the fuel is separated at the fuel separating vessel 6. Therefore it does not occur that air in the fuel causes error in fuel consumption amount indicated by the meter.

By then closing the manual gate switch 20 and the manual reset switch 26, the integrated flow amount can be obtained. Also by closing the unit time setting switch 27, the flow amount per unit time can be obtained.

When the specific gravity of the fuel is measured after driving of the vehicle, the fuel level of the bubble separating vessel 6 is suitably adjusted for measuring the specific gravity of the fuel by means of the float 24. The fluid level is suitably adjusted by the automatic air vent valve 28. However, when the fluid level is too low, the switch 15 is closed to open the electromagnetic valve 4 so that the fluid level is elevated by pressure from the fluid pump 1. When the fluid level is too high, switches 15 and 16 are closed to open the air vent electromagnetic valve 5 so that fluid is discharged and the fluid level is lowered.

Further, the joint 2 is disconnected and both ends are closed, the electromagnetic valve 4 is opened and engine is driven so that fluid is consumed in engine to lower the fluid level. The closing of both ends of the disconnected joint can be performed by a well-known universal fluid joint in which both ends are closed when the joint is disconnected.

When the system is empty or a large amount of air is contained within the fluid consumption meter, with arrangement as shown in FIG. 2 wherein the circulation circuit is not provided with fluid coupling, much time is needed for the air venting operation. Sometimes the air venting operation cannot be performed at all because of the circulation of air only. With the arrangement as shown in FIG. 1 wherein the circulation pipeline is provided with fluid couplings 29 and 30, rapid venting of the system can be effected by disconnecting the fluid couplings 29 and 30 as shown in FIG. 3, the fluid coupling 29 being closed and the fluid coupling 30 being opened, and turning on the air vent switch 14. Air and fluid together are thereby exhausted through the fluid coupling 30 so that air venting can be quickly performed.

In case it is desired to take out the fluid within the fuel consumption meter, the joints 2 and 9 are disconnected and the switch 14 is turned on to exhaust the fluid.

When a universal fluid coupling which closes both ends when disconnected is used in the joints 2 and 9, the amount of air mixed in the fuel consumption meter and pipe line is quite small, so the operation illustrated in FIG. 3 need not be frequently performed.

Also the arrangement of auxiliary pipe lines is not restricted to embodiment shown in the figures, and the electric pump 11 may be provided in the auxiliary pipeline 33.

According to the invention constituted as above described, forced air venting in a fuel consumption meter and pipeline can be performed in the state that the fuel consumption meter is connected and engine is stopped. Also self-checking of correct performance of the fluid meter can be performed. Therefore, even in an exhaust gas test which must begin in the cold state of engine, the amount of fuel consumption can be accurately measured.

Since fuel flows from the bubble separating vessel to the fuel flow measuring instrument when measuring fuel flow, the fuel consumption amount is not disturbed by bubbles within the fluid, and variation of the fluid level at the bubble separating vessel does not change the fluid consumption amount.

Moreover, the fluid flow can be integrated at definite time and per unit time, and specific gravity and temperature of the fuel can be measured after completion of measurement of the fuel consumption amount without removing fluid to a separate vessel. Also fuel in the pipeline within the fuel consumption meter can be easily taken out by means of the electric pump.

What I claim and desire to secure by letters patent is:

1. An instrument for measuring the fuel consumption of an engine having a fuel pump and a fuel supply member, comprising a main pipeline containing in series an air separating vessel and fuel flow measuring means, said air separating vessel having means for venting air therefrom, means for detachably connecting said main pipeline between the fuel pump and fuel supply member of the engine with said air separating vessel upstream of said fuel flow measuring means, an auxiliary pipeline connected in parallel with said main pipeline to provide a recirculation circuit comprising said main pipeline including said air separating vessel and said fuel flow measuring means, and said auxiliary pipeline, valve means in said auxiliary pipeline, and pump means in said recirculating circuit for circulating fuel through said circuit to eliminate air from the circuit by recirculation through said air separating vessel.

2. An instrument according to claim 1, in which said auxiliary pipeline includes a disconnectible coupling comprising a downstream coupling element which closes upon disconnecting of the coupling and an upstream coupling element which remains open, whereby operation of said pump means produces discharge of air and liquid from said pipelines.

3. An instrument according to claim 1, in which said main pipeline includes second valve means upstream of said air separating vessel and said pump means in a second auxiliary pipeline bypassing said second valve means.

4. An instrument according to claim 1, comprising means for activating said fuel flow measuring means to provide a reading of fuel flow during recirculation of fuel through said recirculating circuit to obtain an indication of completion air venting and proper operation of said measuring means.

5. An instrument according to claim 1, comprising a specific gravity measuring float in said air separating vessel for measuring the specific gravity of said fuel.

6. An instrument according to claim 5, comprising means for adjusting the level of liquid in said air separating vessel when measuring the specific gravity of said fuel.

7. An instrument according to claim 1, comprising a thermometer in said air separating vessel for measuring the temperature of said fuel.

8. An instrument according to claim 1, in which said pump means is in position to discharge fuel from said main pipeline when disconnected from said fuel pump and said fuel supply member.

9. An instrument according to claim 1, in which said fuel flow measuring means comprises means for generating electrical signals proportional to fuel flow and in which means is provided for receiving said signals and integrating them during a selected period of time to measure the amount of flow per unit time.

10. An instrument according to claim 1, in which said pump means and said valve means are electrically operable, comprising coordinated control circuit means for concurrently opening said valve means and operating said pump means.

* * * * *